Oct. 25, 1932.  J. B. WILLINGS  1,884,461
ADJUSTABLE TRACTOR
Original Filed Feb. 20, 1930  2 Sheets-Sheet 1
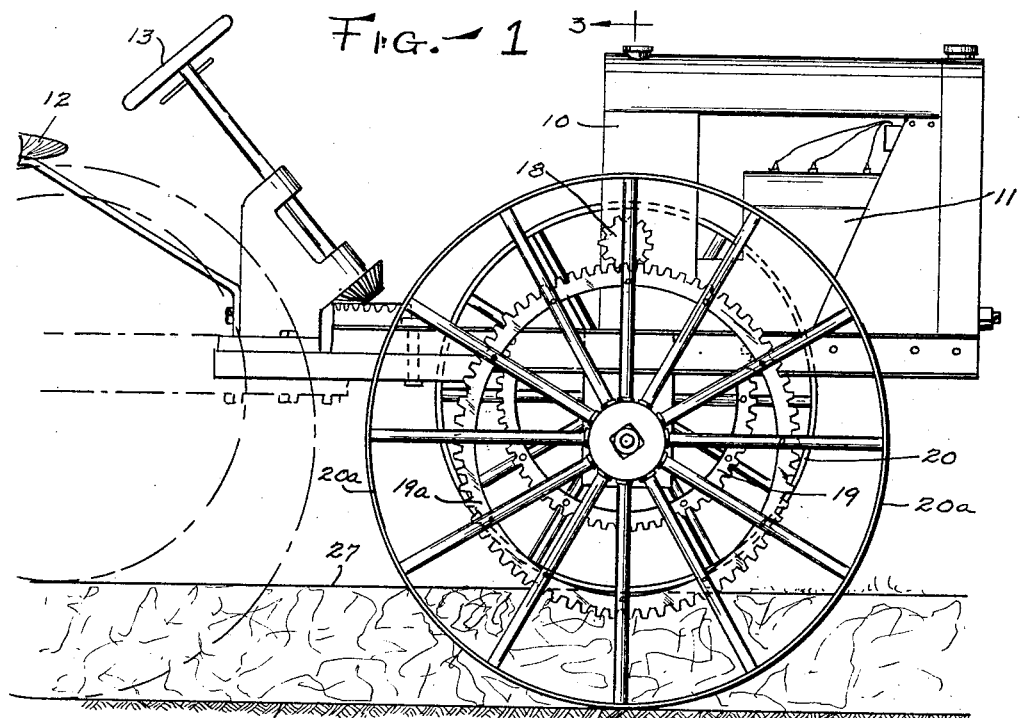
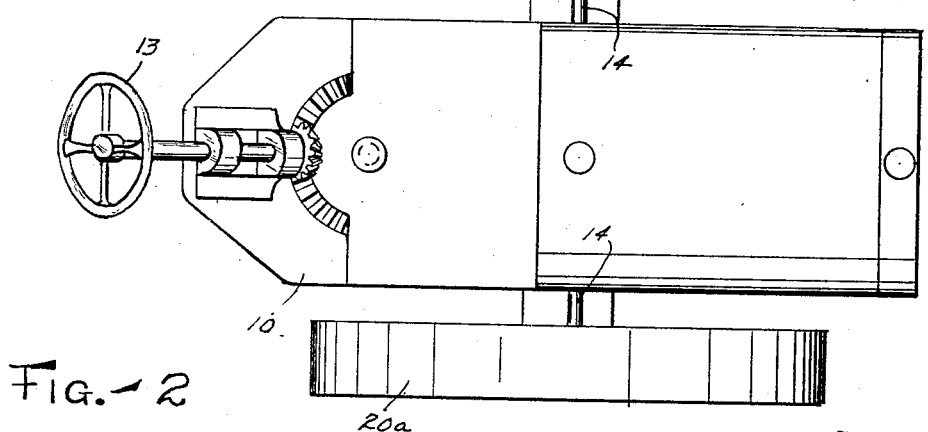
Inventor
JOSEPH B. WILLINGS
By Frank D. Gray
Attorney Oct. 25, 1932.  J. B. WILLINGS  1,884,461
ADJUSTABLE TRACTOR
Original Filed Feb. 20, 1930  2 Sheets-Sheet 2

Inventor
JOSEPH B. WILLINGS
By Frank D. Gray
Attorney

Patented Oct. 25, 1932

1,884,461

UNITED STATES PATENT OFFICE

JOSEPH B. WILLINGS, OF OIL CITY, PENNSYLVANIA

ADJUSTABLE TRACTOR

Application filed February 20, 1930, Serial No. 429,884. Renewed June 11, 1932.

The present invention relates to improvements in adjustable tractors and has for an object to provide an improved tractor having convertible tractor wheels for traveling on level ground or on uneven surface requiring that one ground wheel shall travel in ditches or furrows as when in plowing.

Another object of the invention is to provide for tractor ground wheels of different diameter with the smaller wheel adapted to travel on the landside, and with the larger wheel traveling in the furrow whereby the tractor may at all times retain an upright level normal position.

A further object of the invention is to provide an improved adjustable tractor so disposed and arranged as to admit of convertible wheels and axle assemblies, in which the larger wheel will be accommodated to the drive of the tractor mechanism.

A still further object of the invention is to provide an improved adjustable tractor in which the necessarily elongated shank for the axle of the larger wheel will be appropriately reinforced by the tractor frame and in which provision is made to compensate for the additional load imposed upon the bolts employed to hold the axle shank to said frame.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a fragmentary side view of an improved adjustable tractor constructed in accordance with the present invention and having wheels of different diameter.

Figure 2 is a fragmentary top plan view of the same.

Figure 3:
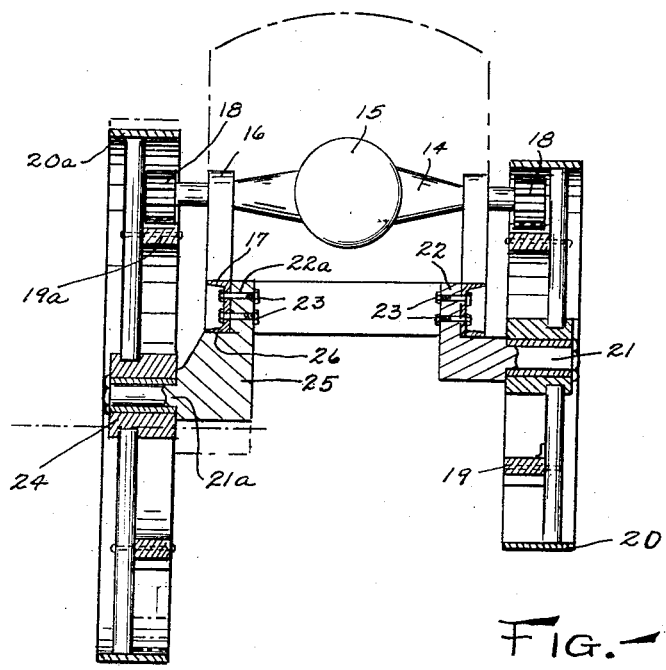
Figure 3 is a vertical cross section taken on the line 3—3 in Figure 1.

Referring more particularly to the drawings, 10 designates generally a tractor of a conventional construction driven by the motor 11, and having the driver's seat 12 adjacent to the steering mechanism 13.

The drive shaft is indicated at 14, being provided with a usual form of differential 15 and journalled in the bearings 16 carried by the side channel beams 17 of the tractor frame. The drive shaft 14 is adapted to communicate motion to both ground wheels of the tractor through the medium of pinions 18 fixed to the end portions of said shaft 14 beyond the bearings 16. In the instance shown in Figure 4, where both ground wheels are of the same diameter, the pinions 18 are shown as disposed in mesh with rim gears 19 carried by the ground wheels 20. The shafts for the ground wheels 20 are provided with shanks 22 extending upwardly from the inner end of the axles or spindles 21 inside the channel beams 17 and bolted or otherwise affixed to said channel beams as by the bolts 23. The tractor wheels 20 may be held to the axles or spindles 21 in any appropriate manner.

As shown to the left in Figure 3, a ground wheel 20ª is adapted to replace one of the normal tractor wheels 20 whenever the tractor is to be employed in plowing. This larger wheel 20ª is carried by a dropped axle or spindle 21ª engaging with the hub 24 of the larger tractor wheel 20ª and held thereto in any appropriate manner. Upon this tractor wheel 20ª is mounted a correspondingly larger gear 19ª, concentric with said spindle 21ª, such gear 19ª adapted to engage one of the pinions 18, when the other pinion is engaged by the smaller gear 19 on the tractor wheel 20.

The shank 22ª of the axle 21ª is provided with an elongated portion 25 which extends below the channel beam 17 and is designed to bring the axis of the shaft or spindle 21ª at a lower level than that occupied by the companion axle or spindle 21 at the opposite side of the tractor. In this way the pinion engaging gear 19ª of the larger tractor wheel 20ª is brought into correct alignment with the pinion 18 of the drive shaft 14. The downwardly elongated portion 25 of the axle shank is thickened externally and is provided with a shoulder 26 adapted to take beneath the adjacent channel beam 17 whereby to take the additional load imposed off the connecting bolts 23.

Figure 4:
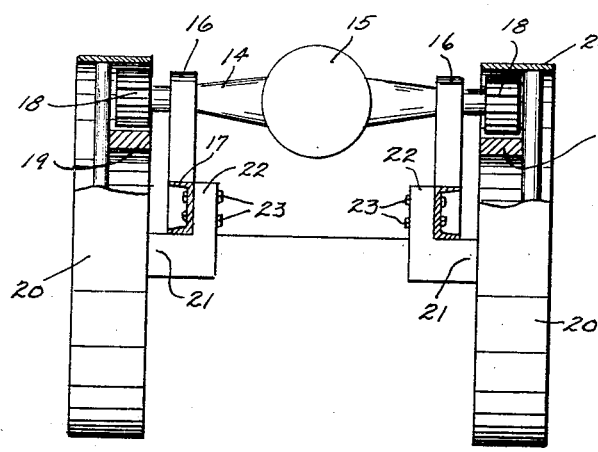
Figure 4 is a similar view but showing the convertible tractor wheels of the same diameter for traveling on level ground.

In the use of the device, the normal condition of the tractor for use in moving over level and uniform ground is as shown in Figure 4, in which both the ground wheels 20 have the same diameter. When, however, the tractor is to be employed in plowing, one of the wheels 20 is removed and a larger wheel 20ª substituted with its dropped axle and elongated shank construction, the bolts 23 being removed and replaced in making the substitution referred to. The condition of the parts is now as illustrated in Figures 1, 2 and 3.

In Figure 1 the tractor is shown as moving over a field in the act of drawing a plow or a gang of plows after it. The tractor wheel 20 of smaller diameter is shown as traveling upon the unbroken landside 27, while the wheel 20ª of larger diameter at the opposite side of the tractor is indicated as extending into the furrow 28.

In this manner the tractor will always stand at a level horizontal position and will not be laterally inclined or tilted as would necessarily follow where the ground wheels were both of the same diameter with one traveling on the landside and the other in the furrow.

It will be appreciated that when using the larger tractor wheel and with the uneven ground at the base of the furrow in which this larger wheel will travel, and with the dropped axle 21ª situated remotely from the channel beam 17 and its point of support thereupon, that greater strain and load will be imposed not only upon the axle shank but also upon the fastening 23 by which this axle shank is united to the tractor frame. In order to compensate for this unequal load, the tractor shank besides extending vertically in contact with the interior face of the channel beam 17, is also thickened beneath the channel beam 17 where it is provided with a shoulder which contacts with a larger area of the lower flange of the channel beam 17. The parts 22ª and 26 of the axle shank therefore form a substantially right angular construction engaging snugly against adjacent parts of the channel beam 17 and resisting any lateral or rocking motion in the shank and axle and relieving the bolts 23 of much of the additional strain to which they would otherwise be subjected.

The arrangement is such that the substitution of a tractor wheel of one diameter to another tractor wheel having a different diameter may be readily made by simply removing the bolt 23, rotating the axle shank so that it will clear the beam 17 and then drawing the entire assembly laterally away from the tractor so as to slide the teeth of the pinion 18 and the gear wheel 19 or 19ª out of mesh.

It is obvious that various changes and modifications may be made in the details of construction and design of the above specifically described embodiment of this invention without departing from the spirit thereof, such changes and modifications being restricted only by the scope of the following claims:

What is claimed is:—

1. In a tractor having a support frame, drive means including spaced and axially alined pinions of equal size, interchangeable tractor wheels of different diameters adapted to engage and be driven by said pinions, and removable axle assemblies for said tractor wheels adapted to be detachably connected with said tractor frame.

2. In a tractor having a support frame, drive means including spaced and axially alined pinions of equal size, interchangeable tractor wheels of different diameters and each having gear means adapted to detachably mesh with the said pinions, axles for the tractor wheels, axle shanks connected to the axles and detachably connected with the tractor frame, certain of said shanks having elongated portions.

3. In a tractor having a support frame, drive means including spaced and axially alined pinions of equal size, interchangeable tractor wheels of different diameters and mounted on axles at different levels and each wheel having rim gears thereon detachably engaging with said drive pinions, axle shanks connected to said axles and having detachable connection with the tractor frame, the shank of the larger of said wheels having elongated downwardly projecting shanks with thickened and shouldered outer portions for engaging the tractor frame.

4. In a tractor having a drive shaft with drive pinions thereon and frame beams, wheels of different diameters at the sides of said tractor having rim gears to mesh with said pinions and to be detachable therefrom by lateral movement, axles for said wheels, shanks connected to the inner portions of the axles and extending inwardly of the beams and against the same, detachable fastenings for securing said spindles to the beams, the shank for the wheel of larger diameter having an elongated shank portion extending downwardly from the beam and also having an outer thickened and shouldered portion adapted to extend beneath the beam and to compensate for strain transmitted to said fastenings.

5. In a tractor having differential drive mechanism including axially alined drive pinions of equal diameter, a land tractor wheel at one side of the tractor, and a detachable tractor wheel of larger diameter at the other side of the tractor for following in an adjacent furrow and driven by said pinions, respectively.

6. In a tractor having differential drive mechanism including axially alined drive pinions of equal diameter, a land tractor wheel at one side of the tractor, and a furrow tractor wheel at the opposite side of the tractor and of larger diameter than the land wheel, driven by said drive pinions, respectively, and a dropped axle for said furrow wheel having detachable connection to the tractor.

7. In a tractor having differential drive mechanism including a horizontal drive shaft with drive pinions of equal diameter mounted on the ends of said shaft, and frame beams, interchangeable tractor wheels of different diameters and mounted on axles detachably secured to the beams, respectively, said tractor wheels having rim gears meshing with said pinions respectively, shanks connected to the inner portions of the axles and extending inwardly and against the beams, the shank for the wheel of larger diameter projecting downwardly from its beam to provide a dropped axle for said larger wheel, so the latter may travel on a lower level than the smaller wheel.

In witness whereof, I have hereunto set my hand this 18th day of February 1930.

JOSEPH B. WILLINGS.